United States Patent
Kwon et al.

(10) Patent No.: US 7,340,177 B2
(45) Date of Patent: Mar. 4, 2008

(54) WDM OPTICAL COMMUNICATION SYSTEM CAPABLE OF MONITORING TEMPERATURE

(75) Inventors: Seo-Won Kwon, Suwon-si (KR); Kyung-Woo Lee, Yongin-si (KR); Jin-Hee Kim, Suwon-si (KR); Se-Youn Lim, Seoul (KR); Jong-Hwa Lee, Suwon-si (KR); Yoon-Sun Lee, Seoul (KR); Jae-Yeon Song, Seongnam-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 610 days.

(21) Appl. No.: 10/862,265

(22) Filed: Jun. 7, 2004

(65) Prior Publication Data
US 2005/0078356 A1    Apr. 14, 2005

(30) Foreign Application Priority Data
Sep. 24, 2003    (KR) ...................... 10-2003-0066354

(51) Int. Cl.
*H04J 14/02* (2006.01)

(52) U.S. Cl. ......................... 398/95; 398/196

(58) Field of Classification Search .................. 398/25, 398/30, 33, 34, 93, 95, 195, 196
See application file for complete search history.

(56) References Cited

U.S. PATENT DOCUMENTS

| | | | | |
|---|---|---|---|---|
| 5,646,762 | A * | 7/1997 | Delavaux et al. | 398/180 |
| 6,546,028 | B1 * | 4/2003 | Tayebati et al. | 372/20 |
| 6,560,255 | B1 * | 5/2003 | O'Brien et al. | 372/34 |

* cited by examiner

*Primary Examiner*—Christina Leung
(74) *Attorney, Agent, or Firm*—Cha & Reiter, LLC

(57) ABSTRACT

A device and method to monitor and temperature compensate change in wavelength within a WDM optical communication system is disclosed. The device includes a laser diode for generating an optical signal for temperature monitoring, a first fiber Fabry-Perot interferometer sensor unit for generating a first sensor signal according to temperature by means of the optical signal, and a processor for monitoring temperature by means of the first sensor signal and an externally provided second sensor signal and equalizing waveforms of the two sensor signals with each other. The externally provided second sensor signal is provided by a remote node that includes a second fiber Fabry-Perot interferometer sensor unit for receiving the optical signal for temperature monitoring to generate the second sensor signal according to temperature, and a waveguide grating router unit for transmitting the second sensor signal to the optical line terminal.

8 Claims, 4 Drawing Sheets

US 7,340,177 B2

WDM OPTICAL COMMUNICATION SYSTEM CAPABLE OF MONITORING TEMPERATURE

CLAIM OF PRIORITY

This application claims priority, pursuant to 35 U.S.C. §119, to that patent application entitled "WDM Optical Communication System Capable of Monitoring Temperature," filed in the Korean Intellectual Property Office on Sep. 24, 2003 and assigned Serial No. 2003-66354, the contents of which are hereby incorporated by reference.

BACKGROUND OF THE INVENTION

1. Field of the Invention

The present invention relates to a wavelength division multiplexed passive optical network, and, more particularly, to temperature monitoring and wavelength compensation within the WDM system.

2. Description of the Related Art

Typical optical subscriber networks use a double star structure in order to minimize the length of an optical line needed to connect the network nodes together. From an optical line terminal (OLT) to a remote node (RN) installed at an area adjacent to the subscriber units, the OLT and RNs are connected via a single strand of optical fiber. The remote nodes, are similarly connected to each associated subscriber unit through a separate optical fiber.

In a wavelength division multiplexing (WDM) systems the subscriber units use or are assigned different wavelengths or channels, each subscriber unit may be referred to by their associated wavelength or channel number. OLTs and the remote nodes must include a multiplexer unit (MUX) for multiplexing individual optical signals and a demultiplexer (DEMUX) for demultiplexing the multiplexed optical signals. A waveguide grating router (WGR) is typically used as for such multiplexer/demultiplexer operations As the remote nodes of a WDM optical network installed at a site adjacent to the subscriber units may be distributed over large distances, the remote nodes may be affected by temperature change caused by changes of season or even by whether it is day and night differently than other RNs or the OLT. The temperature range that a remote node must operate over has been established by system specifications of at least 120 degrees Centigrade (deg. C.), i.e., from −40 to +80 deg. C., and a maximum change rate of temperature of 1 deg. C./min.

The WGR used as a multiplexer/demultiplexer, as described above, has a rate of change of wavelength with respect to temperature that is determined based on the materials from which the WGR is made. For example, when the WGR is made from general semiconductor materials, the rate of change of wavelength with respect to temperature is about 0.1 nm/deg. C. On the other hand, when the WGR is made from silicon dioxide ($SiO_2$) the rate of change of wavelength with respect to temperature is about 0.015 nm/deg. C. See for example, '*A Wavelength-Matching Scheme for Multiwavelength optical Links and Networks Using Grating Demultiplexers*', F. Tong, et. al, Journal of IEEE Photon. Tchnol., Lett., seventh volume, pp. 688-690, (1995).

Consequently, the wavelength of a WDM light source for downstream transmission and the received wavelength of the WGR at the remote node (or the wavelength of the WGR in the OLT and the wavelength of the WGR in the remote node) may not coincide with each other, resulting in an output loss on channels transmitted. Crosstalk between adjacent channels is further increased as the nominal wavelength of one channel approaches the nominal wavelength of an adjacent channel. Hence, the transmission performance of a system begins to deteriorate as the temperature in the OLT and/or the remote nodes changes.

In order to prevent the transmission performance from being deteriorated, wavelength tracking methods have been proposed that can equalize the wavelength of the WDM light source(s) for downstream transmission with the wavelength of the WGR in the remote node as changes occur according to temperature of the site. Such a wavelength tracking methods are well-known in the art and need not be discussed in detail herein. See, for example, '*Fiber-Grating Sensor for Wavelength Tracking in Single-Fiber WDM Access PON's*', Randy Giles and Song Jiang, Journal of IEEE Photon. Tchnol., Lett., ninth volume, pp. 523-525, (1997); '*Wavelength Tracking of a Remote WDM Router in a Passive Optical Network*', D. Mayweather, et. al, Journal of IEEE Photon. Tchnol., Lett., pp. 1238-1240 eighth volume (1996); and '*Demonstration of a 12×155 Mb/s WDM PON Under Outside Plant Temperature Conditions*', R. Monnard, et. al, Journal of IEEE Photon. Tchnol., Lett., pp. 1655-1657, ninth volume (1997).

Conventional wavelength tracking method use a monitor channel dedicated only for wavelength tracking, a dedicated optical fiber for providing the monitor channel to a central office and an optical fiber diffraction grating. In one method, a measure of the difference between the wavelength of the WDM light source at the OLT and the wavelength of the WGR in the remote node is determined and the temperature of the WDM light source is adjusted so that the wavelength of the light source coincides with the wavelength of the WGR in the remote terminal.

Another method of equalizing the wavelength of the WDM light source for downstream transmission in the OLT is described in Korea Patent Application No. 1999-35226 (filed on Aug. 24, 1999, KAIST), entitled "An Apparatus and a Method for Tracking a Wavelength in a Spectrum-Sliced WDM Passive Optical Network". The wavelength tracking method of equalizing the wavelength of the WGR in the OLT with the wavelength of the WGR in the remote node proposed in Korea Patent Application No. 1999-35226 is shown in FIG. 1 for the upstream transmission in a WDM passive optical network. A similar operation is proposed for downstream transmission and need not be described in detail herein.

The passive optical network shown includes a central office 100, a remote node 200, and an upstream line for transmitting an upstream signal from remote node 200 to central office 100.

Remote node 200 includes multiplexer 201 represented by a WGR, a temperature controller 202 that provides a current to a thermoelectric cooler 220, that is used to control or adjust the temperature of multiplexer 201.

Central office 100 includes an erbium-doped fiber amplifier 102 for amplifying an upstream signal, demultiplexer 101, represented WGR, and a wavelength tracking apparatus 110. The wavelength tracking apparatus 110 adjusts a current provided in a thermoelectric cooler 120 in order to control and adjust the temperature of the demultiplexer 101.

Wavelength tracking apparatus 110 includes optical coupler 104, photodetector 111, a plurality of optical couplers 105 and 106, a plurality of photodetectors 115 and 116, a plurality of diodes 117 and 118, an amplifier 119, a differential amplifier 113, and a control circuit 112.

The optical coupler 104 is located between the erbium-doped fiber amplifier 102 in an upstream line and the demultiplexer 101 and provides optical power passing through the upstream line to the photo detector 111. In the embodiment of the invention shown the optical coupler 104 distributes the received optical signal at the rate of 99:1. One skilled in the art would recognize that the coupler may distribute the optical power in other ratios without altering the scope of the invention. The photodetector 111 receives the optical signal distributed from the optical coupler 104 and generates and outputs a voltage proportional to the intensity of optical power.

The optical couplers 105 and 106 are connected to channels of output terminals of the demultiplexer 101 and distribute optical power outputted from the demultiplexer 101 to optical power meters 107 and 108 and the photodetectors 115 and 116, respectively. The photodetectors 115 and 116 generate and output a voltage proportional to the intensity of the optical power received from the optical couplers 105 and 106.

The photodetectors 115 and 116 are connected to the amplifier 119 through the diodes 117 and 118, respectively. The highest voltage of the voltages generated by photodetectors 115 and 116 is provided to the amplifier 119 through the diode 115 or 116 and is then amplified by the amplifier 119. The differential amplifier 113 has an inverting terminal connected to an output terminal of the amplifier 119 and a non-inverting terminal connected to an output terminal of the photodetector 111, and the differential amplifier 113 amplifies and outputs the difference between two input signals. The control circuit 112 outputs a current to the thermoelectric cooler 120 for adjusting temperature of demultiplexer 101. The level of current is determined based on the size and change of the signal outputted from the differential amplifier 113.

In the system described above, an optical signal in each channel is split, e.g., 10%/90%, and the intensities of the 10% signals are detected by the photodetectors 115 and 116, and the detected intensities are added to each other. Then, the intensity obtained through the addition is compared with an intensity of an optical signal before passing through the WGR 101. When the two intensities are different from each other due to abnormality of any one channel or the photodetectors, the control circuit 112 determines that a wavelength is shifted due to the change of temperature and performs an operation such as an adjustment of temperature occurs.

Since intensities of the optical signals passing through respective channels must be added to each other, couplers and photodetectors must be provided to respective channels in order to split the optical signals. Therefore, the cost of a system increases. Hence, there is need for a low cost system and method for monitoring wavelength shift and adjusting temperature to compensate for such shift.

SUMMARY OF THE INVENTION

An object of the present invention is to provide a device in a WDM optical communication system capable of monitoring temperature, that can prevent disagreement of pass wavelength bands by comparing output waveforms from fiber Fabry-Perot interferometer sensors installed at routers at an optical line terminal and a remote node with each other and controlling the router in the optical line terminal to have the same temperature as that of the router in the remote node.

Another object of the present invention is to solve a problem in that the shift of a wavelength due to the influence of temperature occurs in a WGR that is a router of a remote node so that a pass band in the WGR does not coincide with that in a router of an OLT in a WDM optical communication system and to reduce a crosstalk.

In order to accomplish the aforementioned object, according to one aspect of the present, there is provided a WDM optical communication system capable of monitoring temperature comprising an optical line terminal including a laser diode for generating an optical signal for temperature monitoring, a first fiber Fabry-Perot interferometer sensor unit for generating a first sensor signal according to a temperature by means of the optical signal, and a processor for monitoring temperature by means of the first sensor signal and a second sensor signal and equalizing waveforms of the two sensor signals with each other, wherein a remote node includes a second fiber Fabry-Perot interferometer sensor unit for receiving the optical signal for temperature monitoring and to generate the second sensor signal according to a temperature, and a waveguide grating router unit for transmitting the second sensor signal to the optical line terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, embodiments according to the present invention will be described with reference to the accompanying drawings. For purposes of clarity and simplicity, a detailed description of known functions and configuration incorporated herein will be omitted as it may make the subject matter of the present invention unclear.

Figure 1:
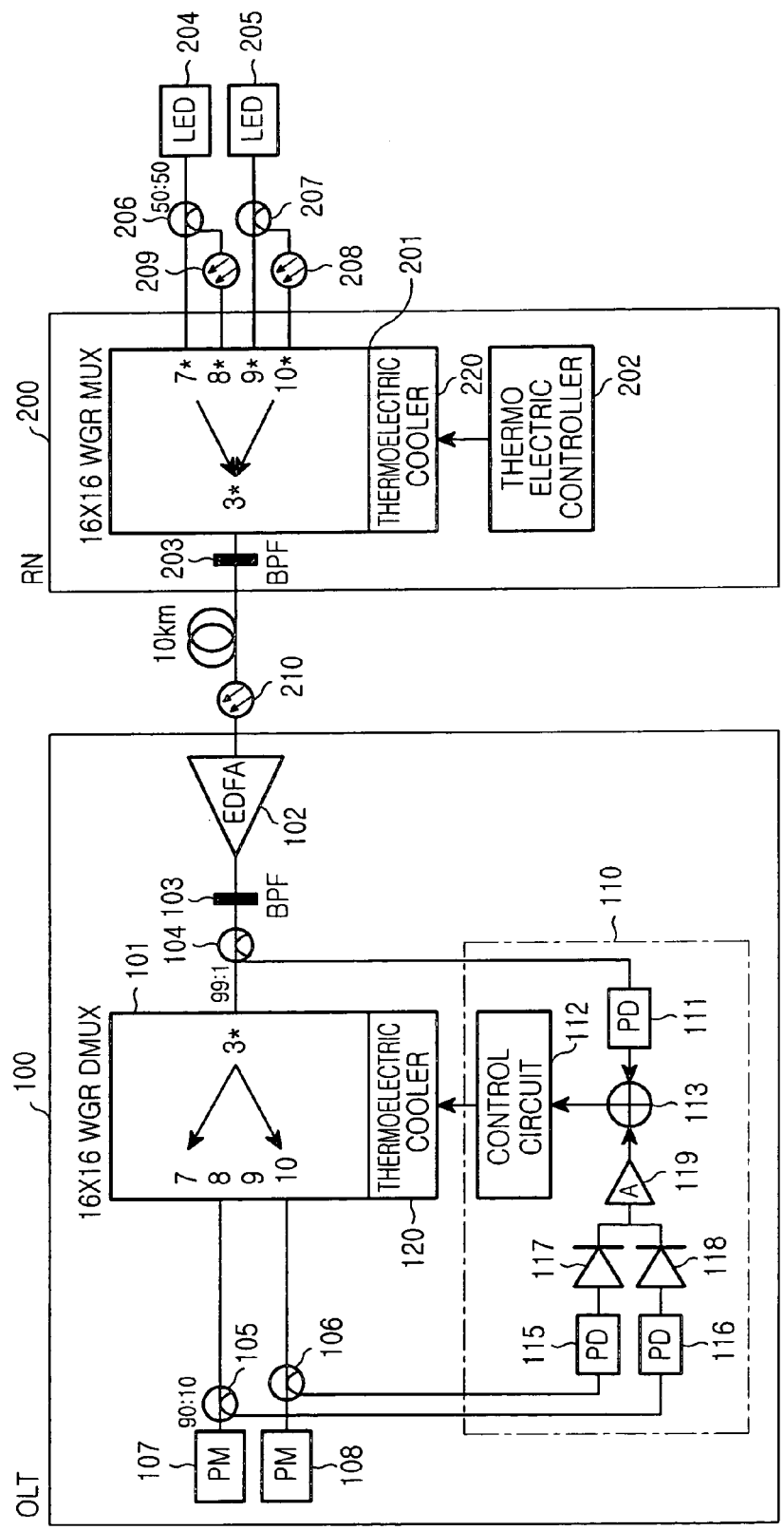
FIG. 1 shows a construction of upstream transmission in a WDM passive optical network according to the prior art.
Figure 2:
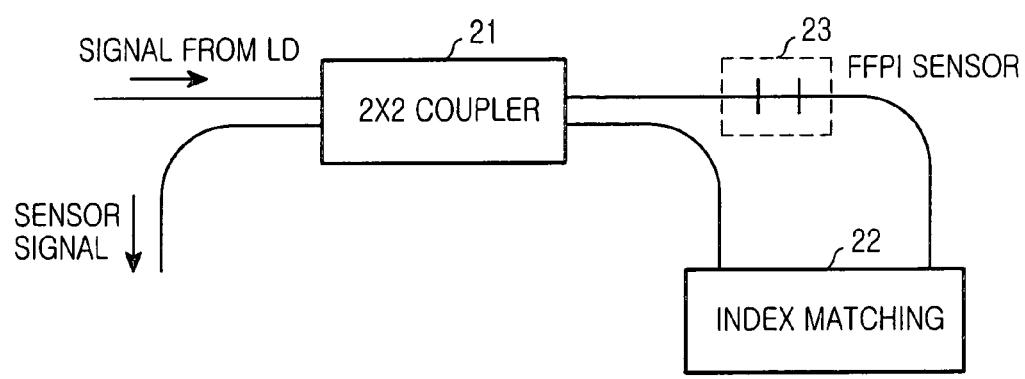
FIG. 2 shows a construction of a fiber Fabry-Perot interferometer sensor used in the present invention.

FIG. 2 is a block diagram showing a construction of an exemplary fiber Fabry-Perot interferometer sensor (FFPI) used in the present invention.

The FFPI shown includes a 2×2 coupler 21, an FFPI sensor 23, and an index matching unit 22. The 2×2 coupler 21 receives a signal from a laser diode (LD) (not shown) and provides the received signal to the FFPI sensor 23 and employs a signal of the index matching unit 22 as a sensor signal that will be subsequently outputted from coupler 21.

More specifically, FFPI sensor 23 receives an optical signal from the 2×2 coupler 21, and uses the received signal as an input signal to index matching unit 22 to generate an output waveform. The index matching unit 22 performs an index match for the output waveform generated by the FFPI sensor 23 and transmits the matched output waveform to the 2×2 coupler 21.

Figure 3:
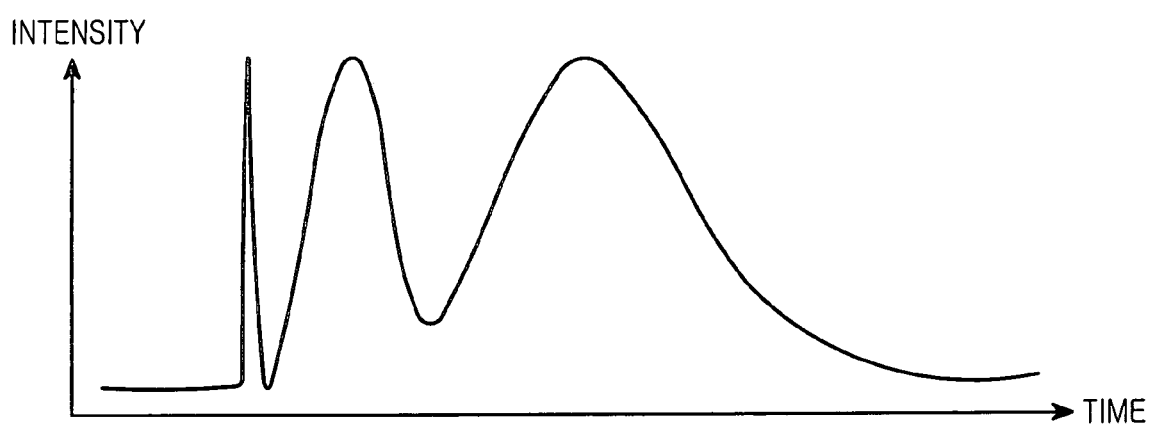
FIG. 3 shows an output waveform of a fiber Fabry-Perot interferometer sensor used in the present invention.

FIG. 3 shows the output waveform of the FFPI sensor 23 used in the present invention. The vertical axis represents signal intensity and the horizontal axis represents time in the output waveform of the FFPI sensor.

When the waveform shown in FIG. 3 is affected by temperature or pressure, the vertices of the waveform move in a sideways direction. The present invention has a characteristic in which such a movement of a waveform due to temperature is checked from a remote node, and temperature is adjusted so that a waveform in an optical line terminal (OLT) coincides with the checked waveform.

Figure 4:
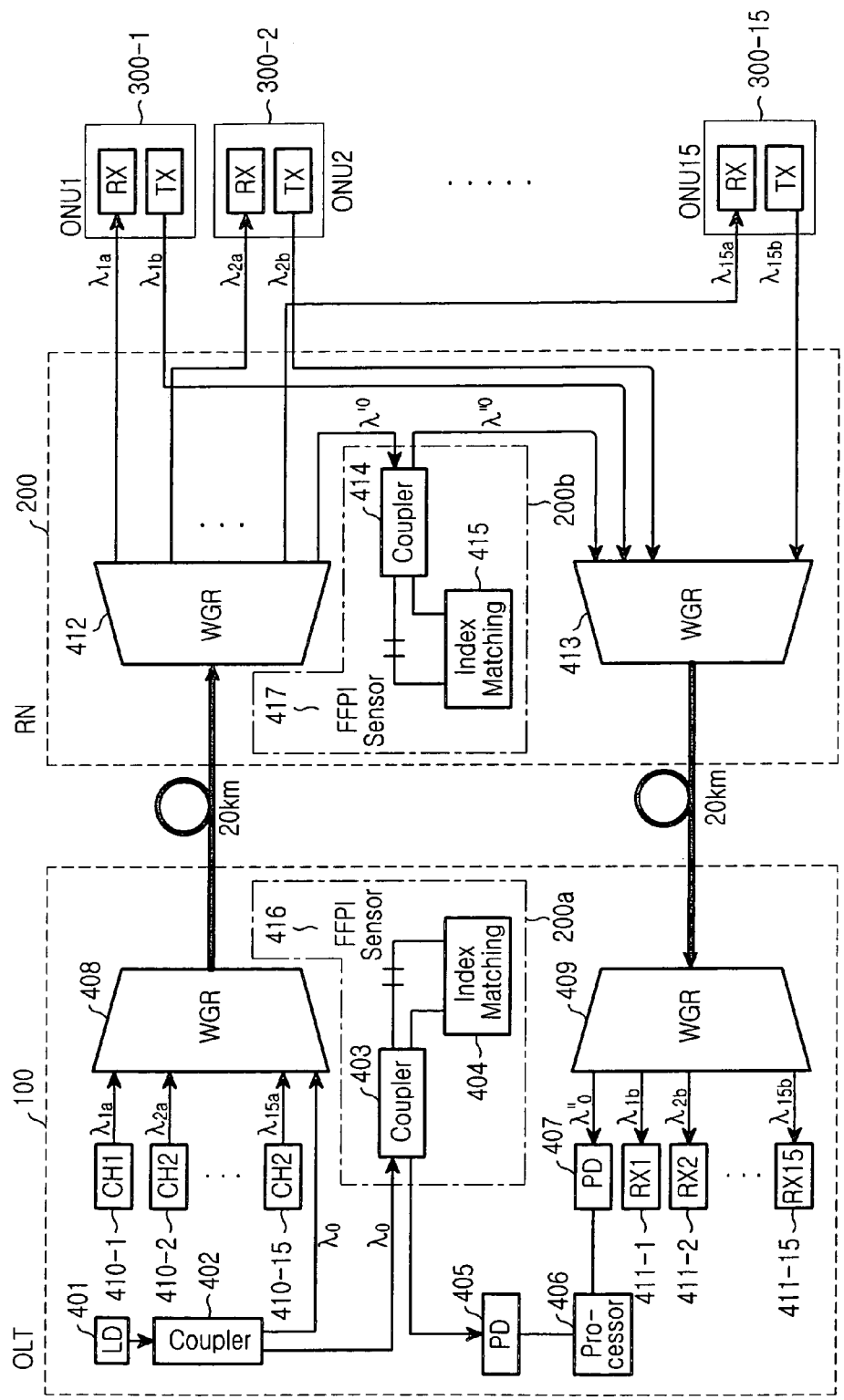
FIG. 4 shows a construction of a WDM passive optical network capable of monitoring temperature according to the present invention.

FIG. 4 is a block diagram showing a construction of a WDM passive optical network capable of monitoring temperature according to the present invention. As shown, a WDM optical communication system according to the present invention includes an OLT 100, remote node 200, and a plurality of optical network units (ONUs). In this exemplary system, OLT 100 includes 15 channels 410-1 to 410-15, a laser diode (LD) 401, a coupler 402, a WGR 408, a WGR 409, a PD 407, a coupler 403, an FFPI sensor 416, an index matching unit 404, a PD 405, and processor 406. The 15 channels 410-1 to 410-15 transmit data through individual wavelengths, represented as $\lambda_{1a}, \lambda_{2a}, \ldots \lambda_{15a}$ and LD 401 generates an optical signal, $\lambda_0$, that is used as a reference signal for temperature compensation as will be more fully described.

The coupler 402 divides the optical signal $\lambda_0$ into two signals and outputs the divided signals to WGR 408 and to coupler 402. WGR 408 then multiplexes the reference signal $\lambda_0$, and individual wavelengths $\lambda_{1a}, \lambda_{2a}, \ldots \lambda_{15a}$ for subsequent downlink transmission to remote node 200.

Coupler 403 receives the reference signal, $\lambda_0$, from coupler or splitter 402 and sends the received signal to the FFPI sensor 416, and employs a signal of the index matching unit 404 as a sensor signal to output the sensor signal to the PD 405. More specifically, and as described with regard to FIG. 2, FFPI sensor 416 receives the signal from the coupler 403 and employs the received signal as an input signal to generate an output waveform and the index matching unit 404 performs an index matching for the output waveform generated by the FFPI sensor 416 to transmit the matched output waveform to the coupler 403.

The PD 405 receives the sensor signal from coupler 403 and converts it into an electrical signal which will be outputted to processor 406.

At the remote node 200, WGR 409 transmits wavelengths $\lambda_{1b}, \lambda_{2b}, \ldots \lambda_{15b}$ upstream to reception channels 411-1 to 411-15, and also sends a signal, $\lambda''_0$, associated with reference signal $\lambda_0$ to PD 407. The PD 407 converts the signal $\lambda''_0$ into an electrical signal that will be outputted to processor 406.

Processor 406 compares the signals transmitted from PD 405 and PD 407 with each other and produces necessary controls signal to equalize the temperature of the OLT 100 with the temperature of the remote node 200 as will be more fully described.

Remote node 200 includes a WGR 412, coupler 414, FFPI sensor 417, index matching unit 415, and WGR 413. WGR 412 demultiplexes the WDM signal received from the OLT 100 into individual wavelengths and provides the demulitplexed signals to ONUs 300-1 to 300-15. The temperature compensation reference signal, referred to at the remote terminal as $\lambda'_0$, to coupler 414. The coupler 414 receives the $\lambda'_0$ signal from the WGR 412 and transmits the received signal to FFPI sensor 417 and employs a signal of index matching unit 415 as a sensor signal which will be outputted. The FFPI sensor 417 receives the signal from the coupler 414 and employs the received signal as an input signal to generate an output waveform. The index matching unit 415 performs an index matching for the output waveform generated by the FFPI sensor 417 and returns the matched output waveform, referred to as $\lambda''_0$ to the coupler 414.

WGR 413 receives upstream signals transmitted from the ONUs 300-1 to 300-15 and the sensor signal $\lambda''_0$ outputted from the coupler 414 and multiplexes and transmits the multiplexed WDM signal OLT 100.

Processor 406, analyzes and compares the waveforms of the signals from the PD 405 and PD 407 and adjusts the temperature of the OLT, to substantially equalize the values processed. Hence, when it is determined that the two waveforms are not substantially equal, it is deemed that temperature of the OLT 100 is not equalized to that of the remote node 200 and the processor 406 sends signals to thermo electric controllers (not shown) to adjust the temperature of the OLT 100. Hence, the temperature of the WGRs 408 and 409 are adjusted to have the same temperature as that of the WGRs 412 and 413 in the remote node 200 under the control of the processor 406.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A WDM optical communication system capable of monitoring temperature comprising:
   an optical line terminal including a laser diode for generating an optical signal for temperature monitoring;
   a first fiber Fabry-Perot interferometer sensor unit for generating a first sensor signal according to temperature by means of the optical signal;
   a processor for monitoring temperature by means of the first sensor signal and a second sensor signal and equalizing waveforms of the two sensor signals with each other, wherein the second sensor signal is provided external to the optical line terminal;
   a remote node having a second fiber Fabry-Perot interferometer sensor unit for receiving the optical signal for temperature monitoring and generating the second sensor signal according to temperature; and
   a waveguide grating router unit for transmitting the second sensor signal to the optical line terminal.

2. The system as claimed in claim 1, wherein the first fiber Fabry-Perot interferometer sensor unit comprises:
   a 2×2 coupler;
   a fiber Fabry-Perot interferometer sensor in communication with the coupler; and
   an index matching unit in communication with the interferometer and the coupler, wherein:
   the index matching unit performs an index matching for an output waveform generated by the fiber Fabry-Perot interferometer sensor associated with the optical signal received by the coupler.

3. The system as claimed in claim 1, wherein the processor compares and analyzes waveforms of the first sensor signal and the second sensor signal with each other, and causes temperature adjustment in the OLT to substantially equalize the first sensor signal and second sensor signal.

4. A method for monitoring and compensating for change in wavelength of a wavelength division multiplexing (WDM) systems caused by temperature changes, the WDM system having an optical line terminal (OLT), remote node, and a plurality of optical network units (ONUs), the method comprising the steps of:
   generating a first sensor signal associated with a transmitted reference wavelength at the OLT generating a second sensor signal from the remote node according to temperature;

comparing the second sensor signal received from the remote node to the first sensor signal; and adjusting the temperature at the OLT to substantially equalize the first sensor and second sensor signals.

5. The method as claimed in claim 4, wherein the step of generating the first sensor signal comprises the steps of:

providing the reference wavelength to a Fabry-Perot sensor to generate an output waveform; and index matching the output waveform.

6. The method as claimed in claim 4, wherein the step of generating the second sensor signal comprises the steps of:

providing a received reference wavelength to a Fabry-Perot sensor to generate an output waveform; and index matching the output waveform.

7. The method as claimed in claim 4, wherein the step of adjusting the temperature comprises the step of:

providing a current to a thermo-cooler at the OLT.

8. The method as claimed in claim 7, wherein the step of providing a current continues until the first sensor signal and the second sensor signal are substantially equal.

* * * * *